United States Patent
Ramos et al.

(10) Patent No.: US 10,628,931 B1
(45) Date of Patent: Apr. 21, 2020

(54) ENHANCING DIGITAL FACIAL IMAGE USING ARTIFICIAL INTELLIGENCE ENABLED DIGITAL FACIAL IMAGE GENERATION

(71) Applicant: International Business Machines Corporation, Armonk, NY (US)

(72) Inventors: Igor S. Ramos, Round Rock, TX (US); Angelo Danducci, II, Austin, TX (US); Stefan A. G. van Der Stockt, Austin, TX (US); Marc Dickenson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/561,317

(22) Filed: Sep. 5, 2019

(51) Int. Cl.
| | |
|---|---|
| *H04N 7/15* | (2006.01) |
| *G06T 5/50* | (2006.01) |
| *H04N 5/247* | (2006.01) |
| *H04N 5/232* | (2006.01) |
| *G06T 5/00* | (2006.01) |

(52) U.S. Cl.
CPC ............. *G06T 5/50* (2013.01); *G06T 5/005* (2013.01); *H04N 5/23232* (2013.01); *H04N 5/247* (2013.01); *H04N 7/15* (2013.01); *G06T 2207/10016* (2013.01); *G06T 2207/20081* (2013.01); *G06T 2207/20084* (2013.01); *G06T 2207/30201* (2013.01)

(58) Field of Classification Search
CPC ....... G06T 5/50; G06T 3/4046; G06T 3/4053; G06T 2207/20084; G06T 2207/20081; G06T 5/00; H04N 7/15; H04N 7/147
USPC ........................................... 348/14.01–14.16
See application file for complete search history.

(56) References Cited

U.S. PATENT DOCUMENTS

| | | |
|---|---|---|
| 2018/0075581 A1 | 3/2018 | Shi |
| 2018/0268201 A1* | 9/2018 | Yu .................... G06K 9/6256 |

(Continued)

FOREIGN PATENT DOCUMENTS

| | | |
|---|---|---|
| AU | 2018100325 A4 | 4/2018 |
| GB | 2559977 A | 8/2018 |

OTHER PUBLICATIONS

"3d face dot mesh", Google Search, last printed Jun. 11, 2019, 1 page, <https://www.google.com/search?client=firefox-b-1-ab&biw=2560&bih=1322&tbm=isch&sa=1&ei=tv_EW4nSIcH8jwSc3oYo&q=3d+face+dot+mesh&oq=3d+face+dot+mesh&gs_I=img.3...7620.7990..8151...0.0..0.87.228.3......0....1..gws-wiz-img.myr8JJRn4Vc#imgrc=_>.

(Continued)

*Primary Examiner* — Melur Ramakrishnaiah
(74) *Attorney, Agent, or Firm* — Michael A. Petrocelli

(57) ABSTRACT

A method and system for enhancing a facial image of a user in real time by digital generation of a portion of a facial image using artificial intelligence (AI) during a video conference with a plurality of participants. The method and system including receiving a digital image of a first portion of a user's face in real time from a camera viewing the first portion of the user's face. The camera is unable to view the second portion of the user's face. The method and system includes improving resolution and/or digitally completing the second portion of the user's facial image, using an AI system. The improving resolution including, receiving the digital image at the AI system which includes a Generative Adversarial Network (GAN). The method and system includes generating, in real time, a complete enhanced digital facial image of the user's face using the GAN.

20 Claims, 9 Drawing Sheets

(56) References Cited

U.S. PATENT DOCUMENTS

2018/0293713 A1    10/2018  Vogels
2018/0307947 A1    10/2018  Choi
2019/0049540 A1     2/2019  Odry
2019/0332850 A1 *  10/2019  Sharma .................... G06K 9/56

OTHER PUBLICATIONS

Karras et al., "Progressive Growing of GANS for Improved Quality, Stability, and Variation", Published as a conference paper at ICLR 2018, pp. 1-26, <https://research.nvidia.com/sites/default/files/pubs/2017-10_Progressive-Growing-of/karras2018iclr-paper.pdf>.
Mell et al., "The NIST Definition of Cloud Computing", National Institute of Standards and Technology, Special Publication 800-145, Sep. 2011, 7 pages.

* cited by examiner

ENHANCING DIGITAL FACIAL IMAGE USING ARTIFICIAL INTELLIGENCE ENABLED DIGITAL FACIAL IMAGE GENERATION

BACKGROUND

The present disclosure relates to using artificial intelligence (AI) to enhance a digital image, and more specifically, the present disclosure relates to a method and system for enhancing a facial image of a user in real time using digital generation of a portion of a facial image.

Users of a video conference may view real-time video, using a camera, of each other during the video conference. A camera can be integrated into the user's computer, free standing, or part of a mobile device, etc. Such a video conference can be supported by a software application and may also include using a cell phone or land line for audio. In one example, a software program can generate a video conference call, integrate use of a telephone call for audio, and provide an option for a video feed in real time of the participates of the conference call.

However, when a user is in a video enabled conference call, or in general using a web/phone camera, a user may not want to be sitting directly in front of a webcam or integrated computer camera at all times. The user may need to move about their office, conduct other tasks, turn in other directs, etc.

SUMMARY

The present disclosure recognizes the shortcomings and problems associated with the lack of mobility associated with using a typical camera in relation to a video conference.

The present invention includes a technique to allow the user freedom of movement by generating a digital replica of the user's face, which shows their current facial expression and facial movement in real time.

The present invention provides a technique for creating a map of the users face where a camera may not be able to capture certain features or portions of the user's face, because of movement by the user or positioning of the camera.

In one aspect according to the present invention, a method for enhancing a facial image of a user in real time by digital generation of a portion of a facial image using artificial intelligence (AI) during a video conference with a plurality of participants includes receiving, at a control system, a digital image of a first portion of a user's face in real time. The digital image is captured from a camera viewing the first portion of the user's face, and the first portion being part of a complete facial image which includes the first portion and one or more second portions. The camera is unable to view the second portion of the user's face, and the digital image thereby is incomplete and/or lacking in resolution for the second portion of the user's face. The method includes improving resolution and/or digitally completing the second portion of the user's facial image that the camera is not able to capture, using an AI system. The improving resolution including, receiving the digital image at the AI system which includes a Generative Adversarial Network (GAN), the GAN using first additional user facial images of the user to generate enhanced additional facial images using a training method by the GAN. The method includes generating, in real time, a complete enhanced digital facial image of the user's face, using the GAN, which includes the digital image of the first portion of the user's face, the first additional user facial images, and the AI generated enhanced additional facial images.

In another aspect according to the present invention, a system for enhancing a facial image of a user in real time, by digital generation of a portion of a facial image using artificial intelligence (AI) during a video conference with a plurality of participants is disclosed. The computer system includes: a computer processor, a computer-readable storage medium, and program instructions stored on the computer-readable storage medium being executable by the processor, to cause the computer system to: receive, at a control system, a digital image of a first portion of a user's face in real time, the digital image being captured from a camera viewing the first portion of the user's face, the first portion being part of a complete facial image which includes the first portion and one or more second portions, wherein the camera is unable to view the second portion of the user's face, the digital image thereby being incomplete and/or lacking in resolution for the second portion of the user's face; improve resolution and/or digitally completing the second portion of the user's facial image that the camera is not able to capture, using an AI system; the improving resolution including, receiving the digital image at the AI system which includes a Generative Adversarial Network (GAN), the GAN using first additional user facial images of the user to generate enhanced additional facial images using a training method by the GAN; and generate, in real time, a complete enhanced digital facial image of the user's face, using the GAN, which includes the digital image of the first portion of the user's face, the first additional user facial images, and the AI generated enhanced additional facial images.

In another aspect according to the present invention, a computer program product for enhancing a facial image of a user in real time, by digital generation of a portion of a facial image using artificial intelligence (AI) during a video conference with a plurality of participants is disclosed The computer program product comprising a computer readable storage medium having program instructions embodied therewith, wherein the computer readable storage medium is not a transitory signal per se, the program instructions executable by a computer to cause the computer to perform a method, comprising: receiving, at a control system, a digital image of a first portion of a user's face in real time, the digital image being captured from a camera viewing the first portion of the user's face, the first portion being part of a complete facial image which includes the first portion and one or more second portions, wherein the camera is unable to view the second portion of the user's face, the digital image thereby being incomplete and/or lacking in resolution for the second portion of the user's face; improving resolution and/or digitally completing the second portion of the user's facial image that the camera is not able to capture, using an AI system; the improving resolution including, receiving the digital image at the AI system which includes a Generative Adversarial Network (GAN), the GAN using first additional user facial images of the user to generate enhanced additional facial images using a training method by the GAN; and generating, in real time, a complete enhanced digital facial image of the user's face, using the GAN, which includes the digital image of the first portion of the user's face, the first additional user facial images, and the AI generated enhanced additional facial images.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
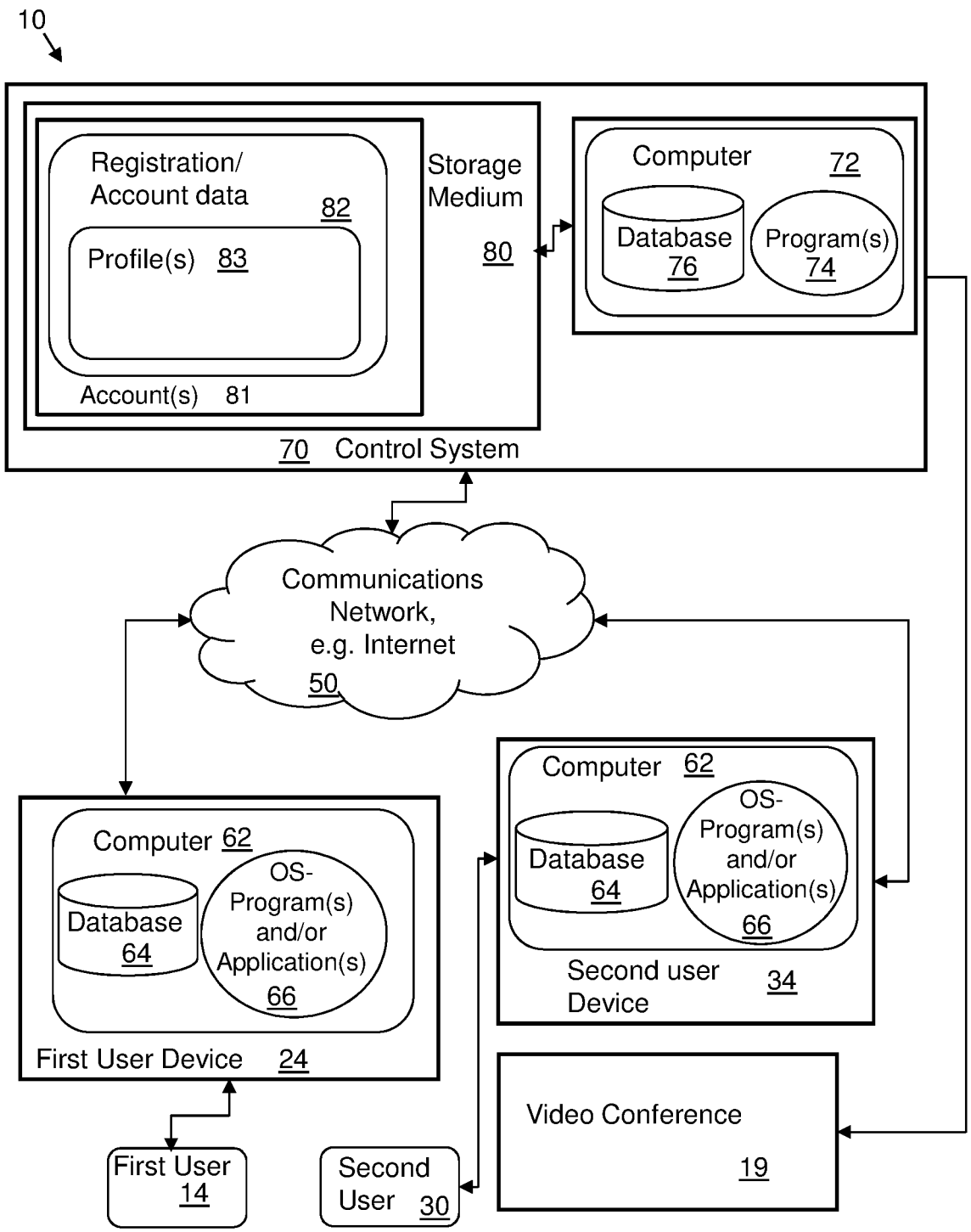
FIG. 1 is a schematic block diagram illustrating an overview of a system and methodology for enhancing a facial image of a user in real time, by digital generation of a portion of a facial image using artificial intelligence (AI) during a video conference, according to an embodiment of the invention.
Figure 2:
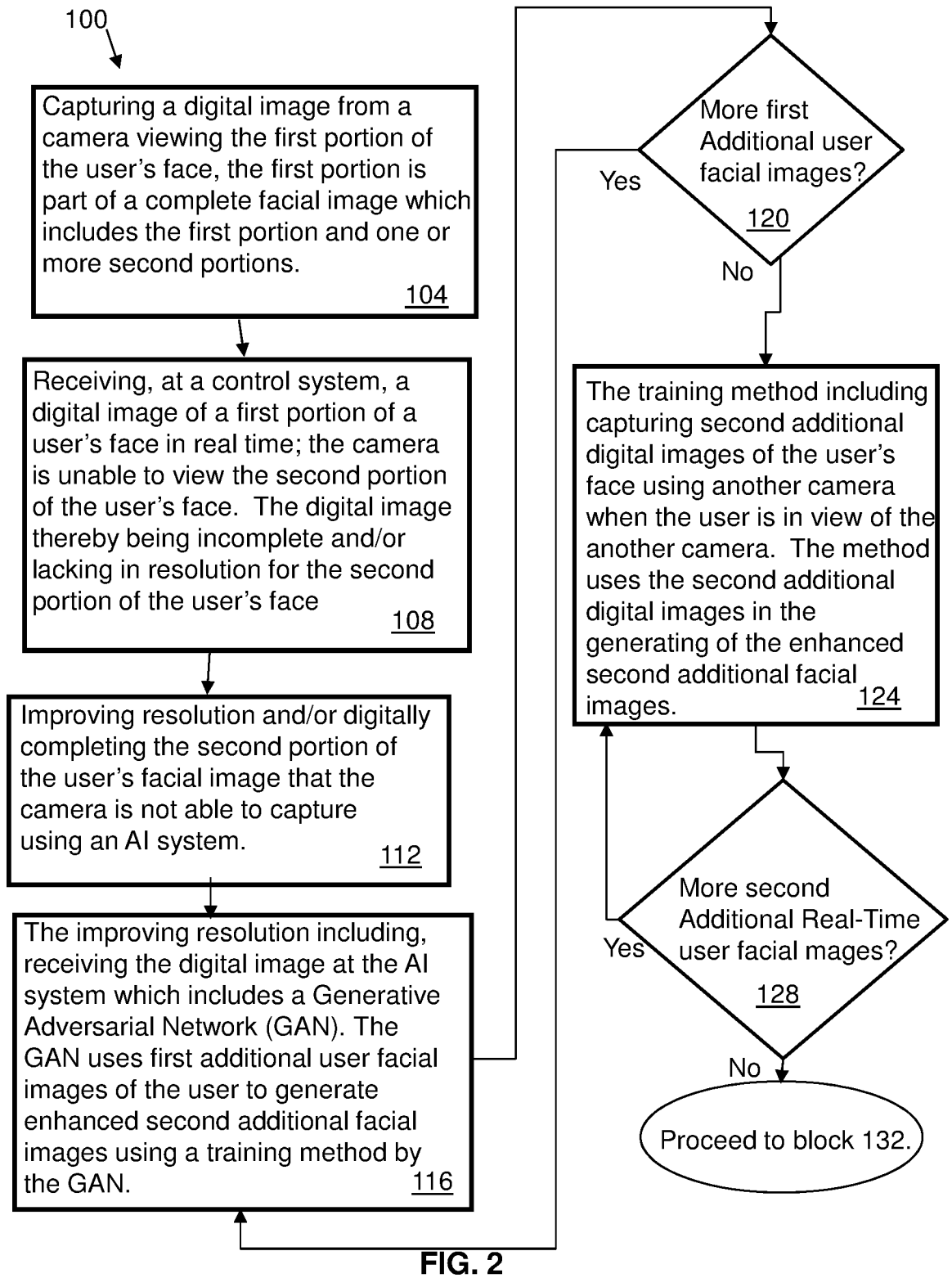
FIG. 2 is a flow chart illustrating a method, implemented using the system shown in FIG. 1, for enhancing a facial image of a user in real time, by digital generation of a portion of a facial image using AI during a video conference, according to an embodiment of the present invention.

Referring to FIGS. 1 and 2, a method 100 (FIG. 2) with reference to a system 10 (FIG. 1) according to an embodiment of the present disclosure is provided for enhancing a facial image of a user such as a first user 14 or first user in real time, by digital generation of a portion of a facial image using artificial intelligence (AI) during a video conference 19 with a plurality of participants. Other users are envisioned and are represented by a second user device 34, and second user 30.

It is envisioned that the control system communicates with an AI system, or in another example can be part of an AI system. The control system an also represent a software application having a front-end user part and a back-end part providing functionality, which can in one or more examples, can interact with, encompass, or be part of larger systems, such as an AI system.

Referring to FIG. 2, the method 100 includes capturing a digital image 316 (see FIG. 4) from a camera viewing a first portion of the user's face, as in block 104. The first portion is part of a complete facial image which includes the first portion and one or more second portions.

The method includes receiving, at a control system 70, the digital image 316 (see FIG. 4) of the first portion of the user's face in real time, as in block 108. The camera is unable to view the second portion of the user's face, therefore a generated image 324 of the digital image is incomplete and/or lacking in resolution for the second portion of the user's face.

In one example, the digital image of the first portion of the user's face is received from a camera 302 in a vicinity of the user and viewing the first portion of the user's face. Examples include a camera mounted in a computer, or a portable camera temporarily positioned. A camera may be mounted too close to a user face, or only at one angle which makes viewing the user's face difficult.

The control system 70 can include user initiated profiles 83 saved in a computer readable storage medium 80 and/or in a database 76, which are shown in FIG. 1 as part of the control system 70. The control system 70 includes one or more programs 74. The programs 74 can be stored in a computer 72 of the control system 70. The program(s) 74 can include, all or in part, a series of executable steps for implementing the method of the present disclosure. A program, incorporating the present method, can be all or in part stored in the computer readable storage medium on the control system or, in all or in part, on a user device such as a first user device 24. It is envisioned that the control system can not only store the profile of users, but in one embodiment, can interact with a website for viewing on the Internet and receive user input related to the method and system of the present disclosure. It is understood that FIG. 1 depicts one or more profiles 83, however, the method can include multiple profiles, users, registrations, etc. It is envisioned that a plurality of users or a group of users can register and provide profiles using the control system to share one or photos, camera feeds, etc., for use according to the method and system of the present disclosure.

The method 100 includes improving resolution and/or digitally completing the second portion of the user's facial image that the camera is not able to capture, using an AI system 308 (see FIG. 4), as in block 112. The first additional user facial images are accessible, with permission from the user, from social media sources of the user, and/or receiving the first additional user facial images from the user as an input, and also with permission from the user.

Regarding any collection of data with respect to the present disclosure, such uploading or generation of profiles is voluntary by the one or more users, and thus initiated by and with the approval of a user. Thereby, a user can opt-in to establishing an account 81 having a profile 83 according to the present disclosure. Such approval also includes a user's option to cancel such profile or account, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

Figure 4:
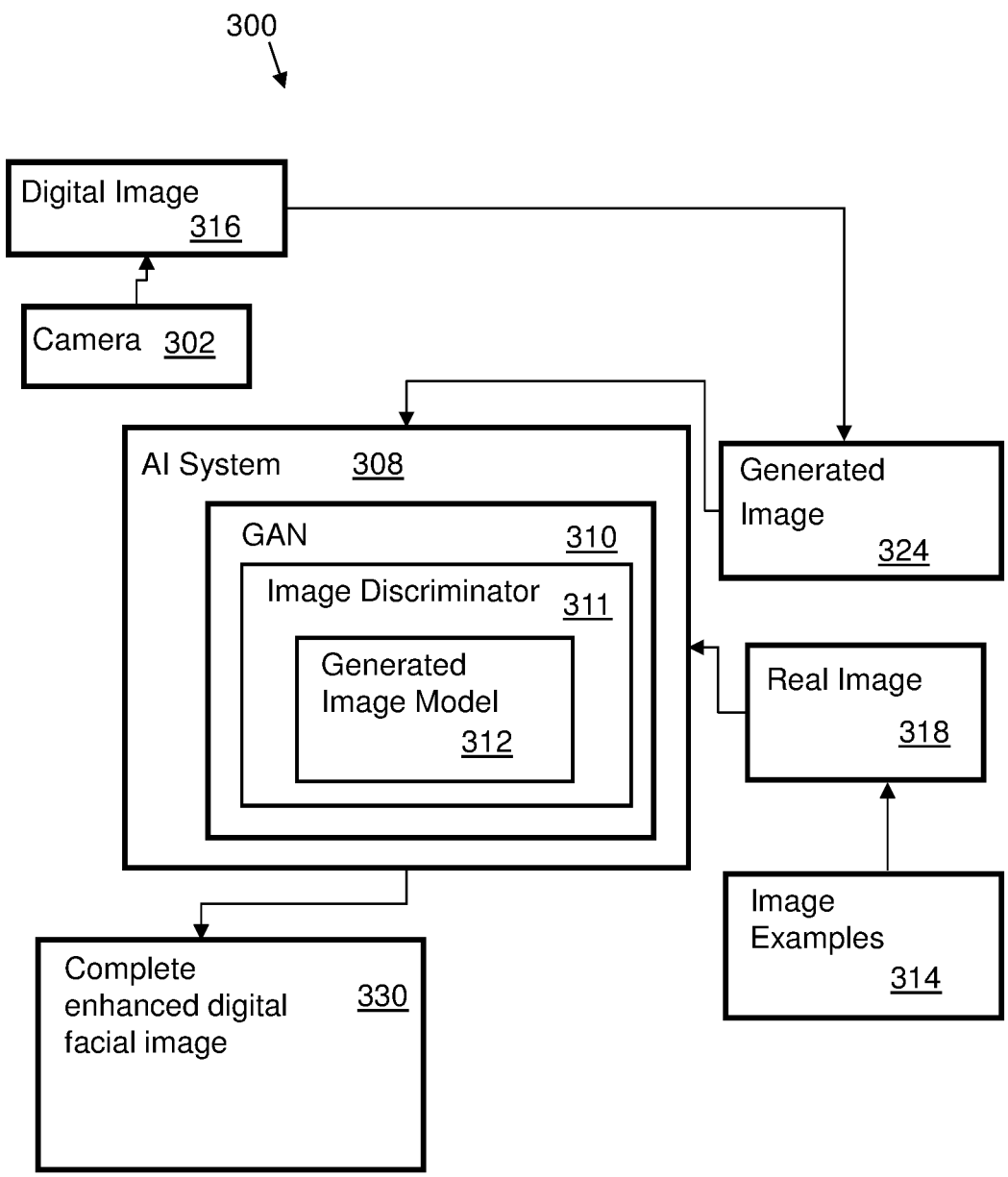
FIG. 4 is an instructional and functional block diagram illustrating features of the present invention in association with the embodiments shown in FIGS. 1-3, for enhancing a facial image of a user in real time, using the features shown in FIGS. 1-3, according to an embodiment of the present invention.

The improving of the resolution includes receiving the digital image at the AI system 308 which includes a Generative Adversarial Network (GAN) 310 (see FIG. 4). The GAN uses first additional user facial images of the user to generate enhanced second additional facial images using a training method by the GAN.

The method can check for more first additional user facial images at block 120, depicted as real images 318 which are generated from image examples 314. If there are more images (e.g., image examples 314), the method uses the images (real images 318) to improve resolution in the enhanced second additional facial images, as in block 116. If there are no more first additional user facial images, the method continues to block 124.

The training method includes capturing second real-time additional digital images of the user's face using another camera when the user is in view of the another camera, as in block 124. The method uses the second additional digital images in the generating of the enhanced second additional facial images, as in block 124.

The method can check for more second additional real time user facial images at block 128. If there are more images, the method uses the images to improve resolution in the generated enhanced second additional facial images, as in block 124. If there are no more second additional real-time user facial images, the method continues to block 132.

Figure 3:
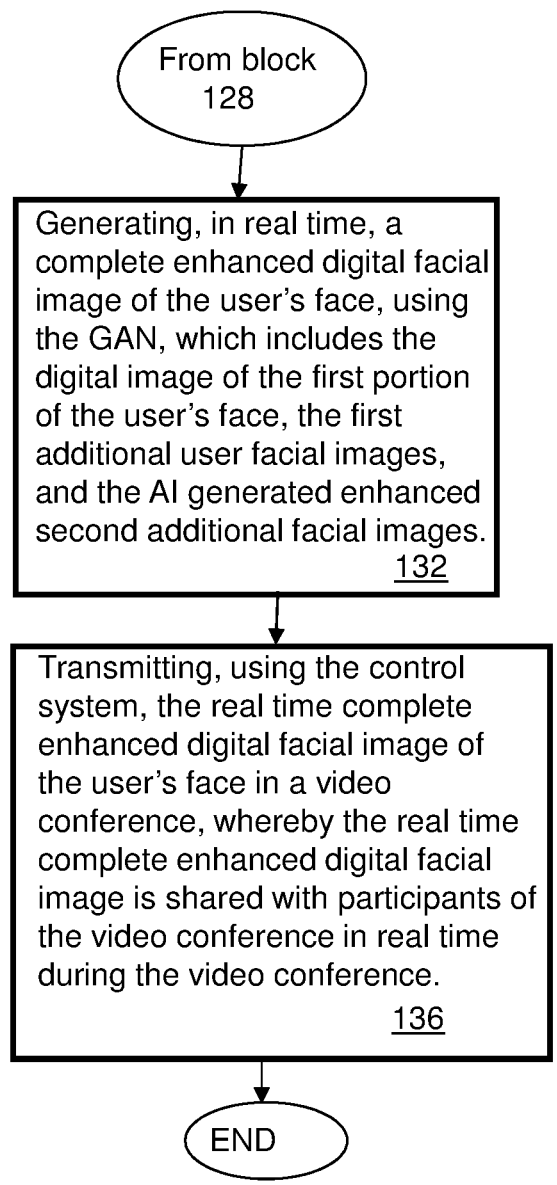
FIG. 3 is a flow chart continuing from the flow chart shown in FIG. 2.

Referring to FIG. 3, the method 100 includes generating, in real time, a complete enhanced digital facial image 330 of the user's face, using the GAN, which includes the digital image of the first portion of the user's face 324, the first additional user facial images 318, and the AI generated enhanced additional facial images 312, as in block 132. The AI generated enhanced additional facial images and the first additional user facial images correspond to the second portions of the user's facial image, for the generation, in real time, of the complete enhanced digital facial image of the user's face 330 (see FIG. 4).

The method 100 includes transmitting, using the control system, the real time complete enhanced digital facial image of the user's face in a video conference 19, as in block 136. The real time complete enhanced digital facial image is shared with participants of the video conference in real time during the video conference.

In addition, the system and method can include performing facial mesh training cycles for the GAN or as part of the GAN, as part of the training method. The training cycles including a user speaking a specialized audiologist-created paragraph to create training data to generate, using an interpolation, the enhanced second additional facial images.

In one example according to the present disclosure, the digital image of the first portion of the user's face is received from a head-set having a camera viewing the first portion of the user's face.

In another example the method can receive the digital image of the first portion of the user's face from a camera in a head set. In this example, the camera is viewing the first portion of the user's face and the user is moving or in motion such that a stationary camera would not view the user's face to provide a real-time facial image of the user to video conference participants. Thereafter, the method can transmit, using the control system, the real time complete enhanced digital facial image of the user's face in a video conference, whereby the real time complete enhanced digital facial image is shared with participants of the video conference in real time during the video conference.

In general, according to the embodiments of the present disclosure, the method and system can generate a user's face in real time when the user's face is not visible or incomplete by using a camera. According to the embodiments of the present disclosure, a user can be in a video conference call, or using a web/phone camera, one may not want to be sitting directly in front of the webcam at all times. In order to allow the user freedom of movement a digital replica of their face may be recreated, showing their current expression and facial movement in real time.

Figure 4A:
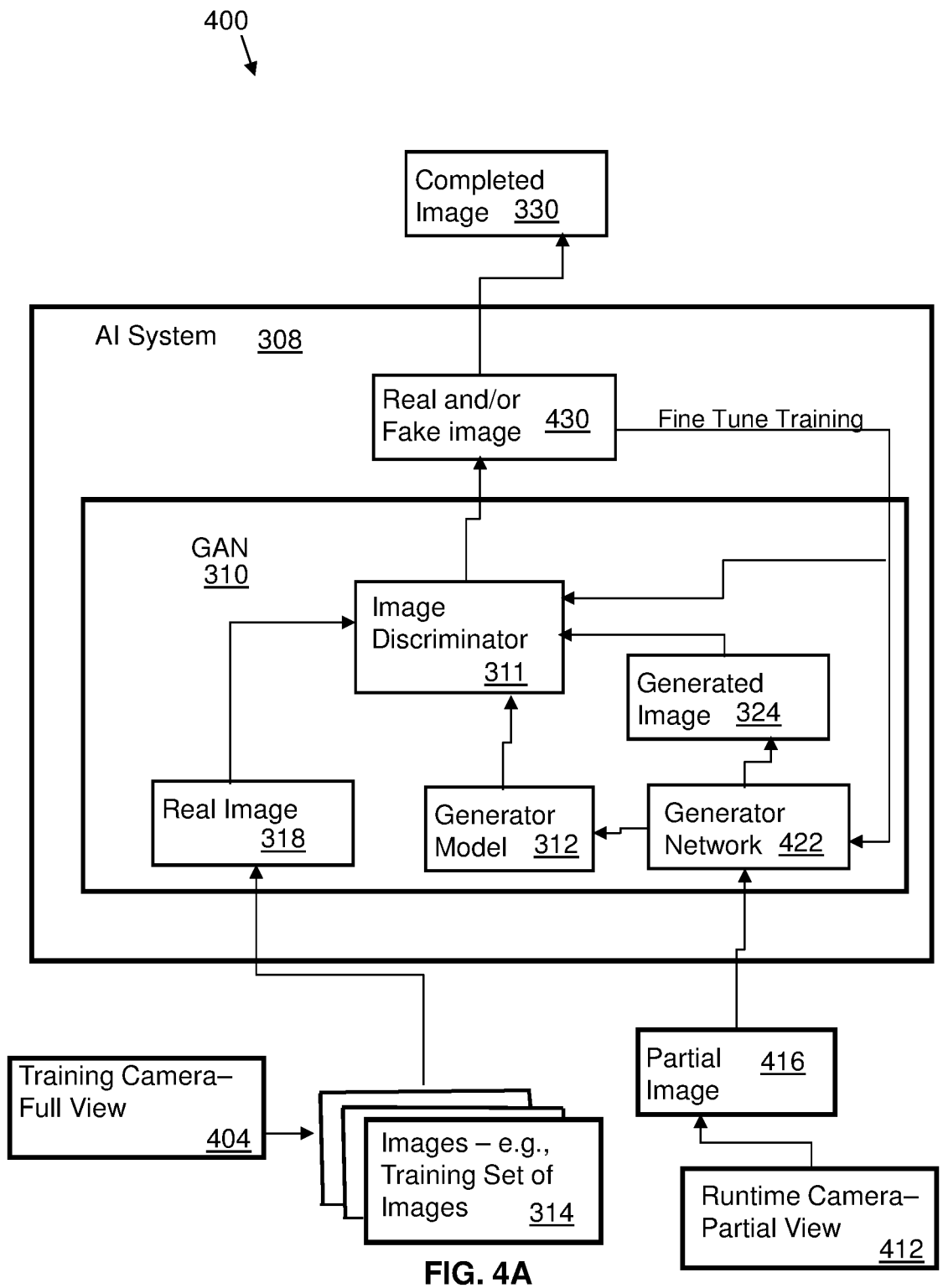
FIG. 4A is a functional block diagram illustrating features of the present invention associated with a GAN system for enhancing a facial image of a user in real time, by digital generation of a portion of a facial image using AI during a video conference, according to an embodiment of the present invention.

Referring to FIG. 4A, according to an example embodiment according to the present disclosure includes a GAN system 400, wherein similar features have the same reference numerals as used in FIG. 4. The GAN system 400 includes a full view training camera 404 which can capture images/training set of images 314 (as also shown in FIG. 4). The images 314 communicate with real image(s) 318. A partial view runtime camera 412 captures partial image(s) 416. The partial image or images 416 communicated with a generator network 422. The generator network connects to a generator model 312 and/or a generated image 324. The real image 318, generator model 312 and generated image 324 can all feed into the image discriminator 311. The image discriminator 311 generates a real and/or fake image 430. The real and/or fake image 430 can receive fine tune training and return to the generator network 422 or the image discriminator 311. The real and/or fake image 430 can result in a completed image 330.

OTHER EMBODIMENTS

In one embodiment of capturing a user's face, a depth sensor can be used to create a 3-d (three dimensional) point cloud map. A 3-d point cloud can be used just like a photograph in the sense that the GAN will "fill the gaps" where it is missing data, for example, the GAN can fill in missing data, where there are gaps of data or lack of data, to create a complete point cloud. After the GAN fills the gaps and generates a complete reconstructed point cloud, the complete reconstructed point cloud is then rendered into a "solid object" using "surface reconstruction" techniques based on the user's training set. Then the solid object reconstruction can be used as the final image/video output.

In one example, infrared depth sensors do not provide a high-resolution point cloud. However, this issue can be solved using a GAN (General Adversarial Network). Alternative embodiments could include time of flight, triangulation, "strengths and weaknesses", conoscopic holography, or regular digital photograph—having a partial view of the user, for example, a certain portion of the user's face is obstructed by an object, or the camera is capturing the user's profile—using micro cameras mounted on glasses, to improve resolution.

Embodiments of the present disclosure can include utilizing a pair of camera-glasses that is capable of creating a map of the users face. However, given the nature of glasses being actually on the user's face certain features may not be able to be scanned. In other words, a camera-glasses is only able to view and capture part of a user's face. Using a GAN (Generative Adversarial Network) it is possible to both generate convincing digital images of missing portions of the user's face such, as the users chin, and update the appearance of the digital replica based on the digitally enhanced scan of the user's face.

Another Embodiment

In one embodiment according to the preset disclosure, the method and system can include setting up training software on the user's laptop. Using a GAN 310 (Generative Adversarial Network), imperfections due to low resolution or even missing data can be generated. The GAN can be trained with images 318 of the user. These images can be retrieved from the user or from user devises with the user's [permission. Utilizing a web cam, the method can perform one or more facial mesh training cycles in front of the webcam to train the GAN. During these training cycles, in one example, it is important to use a specialized audiologist created paragraph that covers all possible vowels and consonants per target language at least, for example, thirty times over. In one example, glasses can be used which view a portion of the user's face, the client is observed repeating the paragraph an additional 7 times. Utilizing these sets of training data, a model that interpolates the image can be created. An additional embodiment may be training the model simply by wearing the glasses in front of your webcam for several hours. The GAN can communicate with an image discriminator 311 for assessing the quality of the generated image by the GAN. Thereby, a generated image model 312 can be generated by the GAN 310.

Once the discriminative model 312, generated by the GAN, is available, in one example, the user may use just the glasses having a camera to accurately display the users face, as the other portions of the user's face not captured by the camera, can be generated by the GAN as above. The GAN can use the current user scan and use the trained model to create a generated image model 312 which passes the image discriminator 311. Thereby, the system and method generates a complete enhanced digital facial image 330.

OTHER EMBODIMENTS

As discussed in other embodiment and examples above, the method and system of the present disclosure is not solely reliant on a camera glasses use case. The same technique can be applied to another wearable that doesn't allow one or a plurality of cameras to observe the entirety of its subject, for instance headphones or similar are also feasible.

Additionally, in another embodiment, the method and system of the present disclosure can be applied to the realm of digital avatars. Using this technique, a camera with a partial view (permanently fixated too close, or at a singular angle which cannot fit an entire object/subject/person or facial image in question into its field of view) can be used to generate a digital replica of the entire object/subject or facial image from a different angle or in its entirety as long as the training data available shows these other features. After training, the additional input(s) can be removed and the original partial view camera can be used in combination with the GAN to generate convincing holistic models.

Additionally, in another embodiment, the method and system of the present disclosure can be applied to capturing an image of any object where, using this technique, a camera with a partial view (permanently fixated too close, or at a singular angle which cannot fit an entire object in question into its field of view) can be used to generate a digital replica of the entire object/subject from a different angle or in its entirety as long as the training data available shows these other features. After training, the additional input(s) can be removed and the original partial view camera can be used in combination with the GAN to generate convincing holistic models.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner.

Also, referring to FIG. 1, the user devices such as the first user device 24 can include a computer 62, database 64, and operating systems and programs or an application 66. These features are shown generically for both systems.

The method 100 according to an embodiment of the present disclosure, can be incorporated in one or more computer programs or an application and stored on an electronic storage medium. It is envisioned that the application can access all or part of instructions necessary to implement the method of the present disclosure. The program or application can communicate with a remote computer system, such as the control system 70 via a communications network 50, e.g., the Internet, and access data, and cooperate with program(s) stored on the control system. In the embodiment of the disclosure shown in FIGS. 1 and 2, the method 100 is incorporated in a program or application 66, which can also be referred to as a software application 66 and stored on the first devices 24. The application can communicate with a control system 70 via a communications network 50. The control system 70 includes a computer 72 having a database 76 and one or more programs 74. In the embodiment of the disclosure shown in FIG. 1, the application 66 communicates with the control system 70 and the one or more programs 74. The control system includes the computer 72 which also has access to the database 76. The control system 70 includes a storage medium 80 for maintaining a registration and account data 82. In an embodiment, the method and system which incorporates the present disclosure includes the control system (generally referred to as the back-end) in combination and cooperation with a front end of the method and system, which is the application. The application is stored on a device and can access data and additional programs at a back end of the application.

It is also understood that the method 100 according to an embodiment of the present disclosure, can be incorporated in (Artificial Intelligence) AI devices, which can communicate with respective AI systems, and respectively AI system platforms. The platforms can be enabling for the AI systems and the devices that employ them. Thereby, such programs or an application incorporating the method of the present disclosure, as discussed above, can be part of an AI system.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
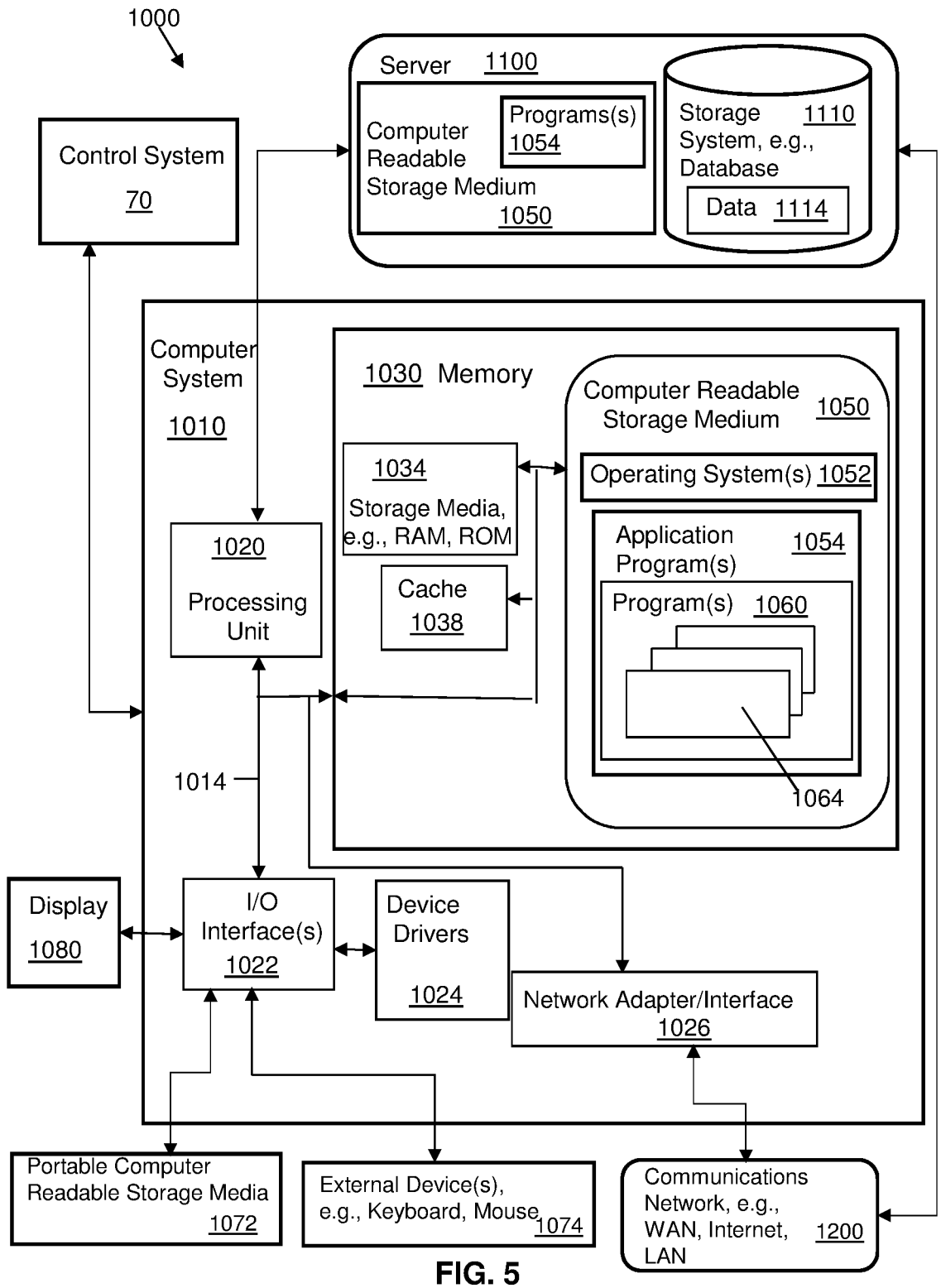
FIG. 5 is a schematic block diagram depicting a computer system according to an embodiment of the disclosure which may be incorporated, all or in part, in one or more computers or devices shown in FIG. 1, and cooperates with the system and methods shown in FIGS. 1-4.

Referring to FIG. 5, a system or computer environment 1000 includes a computer system 1010 shown in the form of a generic computing device. The method 100, for example, may be embodied in a program 1060 embodied on a computer readable storage device, for example, generally referred to as memory 1030 and more specifically, computer readable storage medium 1050. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 can include all or part of the computer system 1010 and its components, and/or the control system can communicate with all or part of the computer system 1010 and its components, to achieve the control system functions described the present disclosure.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 6:
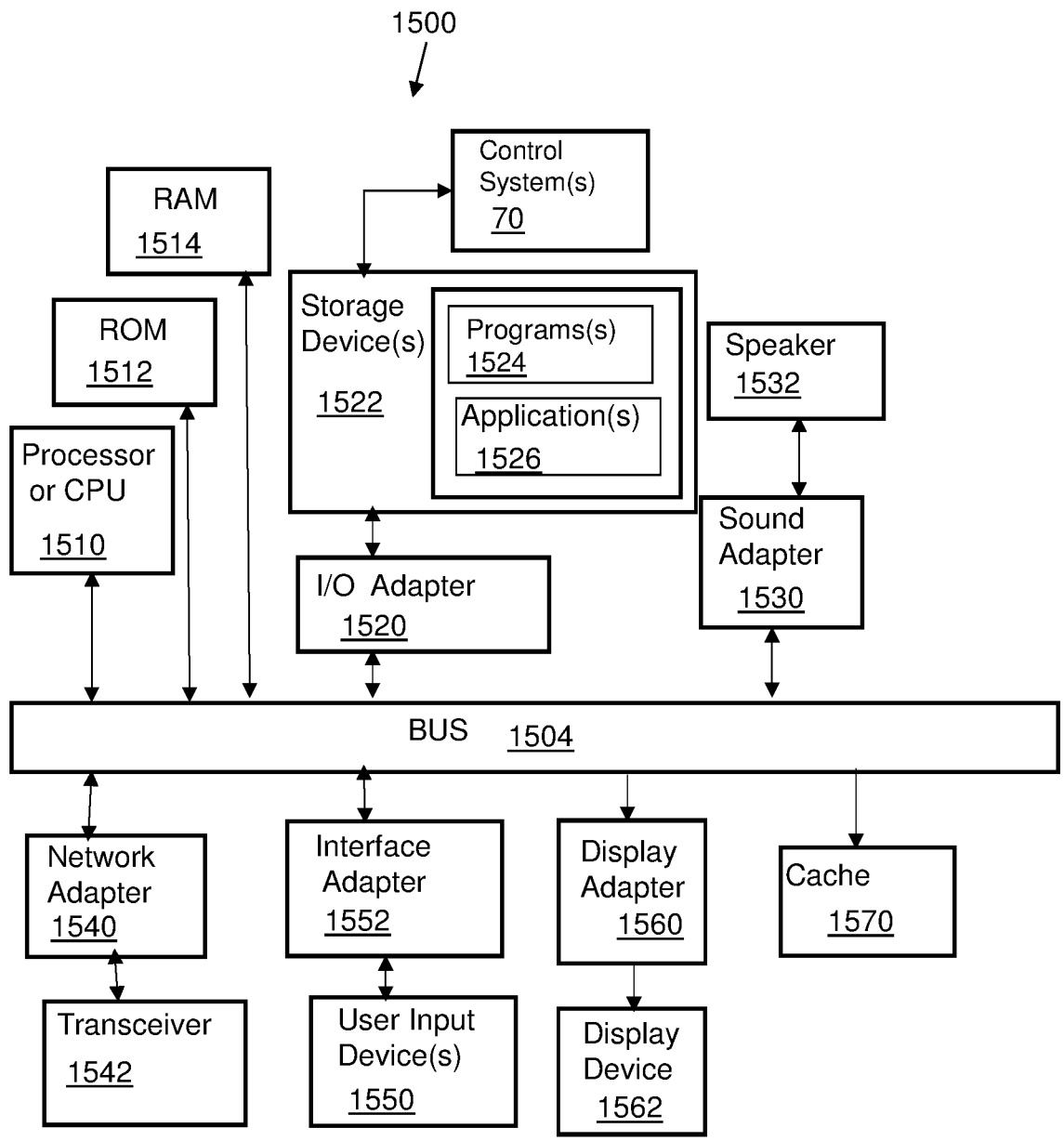
FIG. 6 is a schematic block diagram of a system depicting system components interconnected using a bus. The components for use, in all or in part, with the embodiments of the present disclosure, in accordance with one embodiment of the present disclosure.

Referring to FIG. 6, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure. The storage device can communicate with the control system 70 which has various functions as described in the present disclosure.

A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
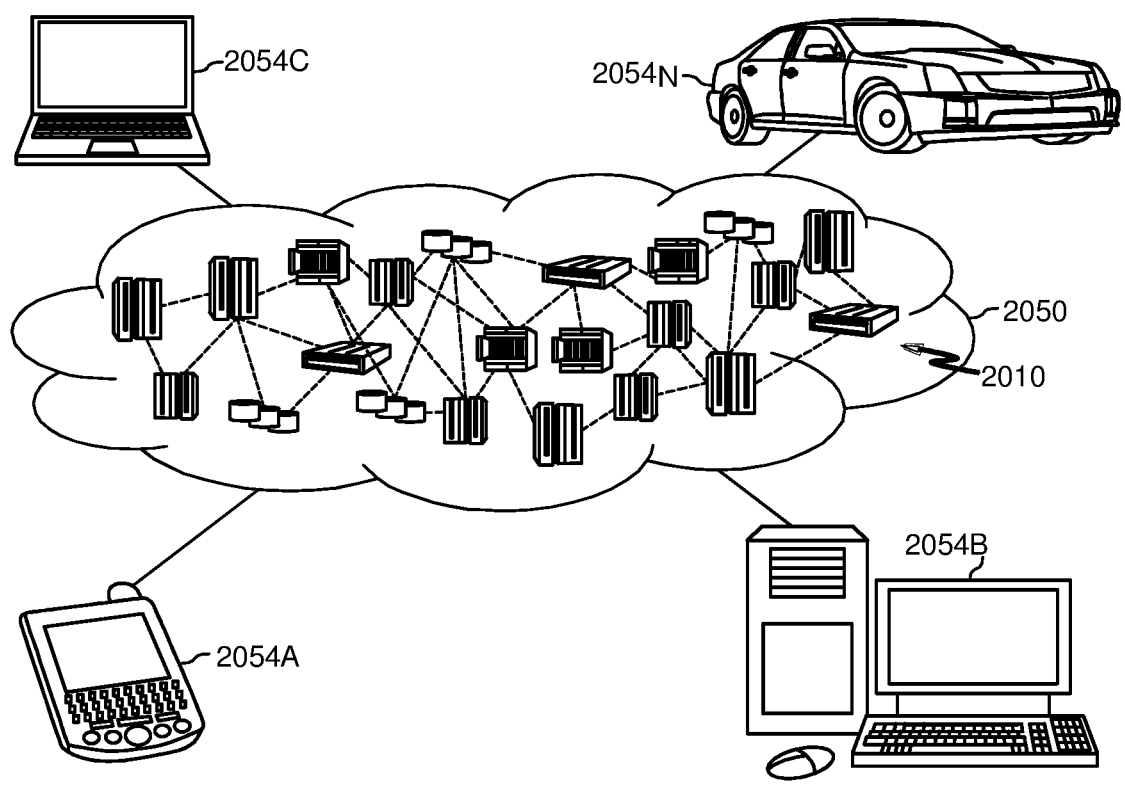
FIG. 7 is a block diagram depicting a cloud computing environment according to an embodiment of the present invention.

Referring now to FIG. 7, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 7 are intended to be illustrative only and that computing nodes 2010 and cloud computing environment 2050 can communicate with any type of computerized device over any type of network and/or network addressable connection (e.g., using a web browser).

Figure 8:
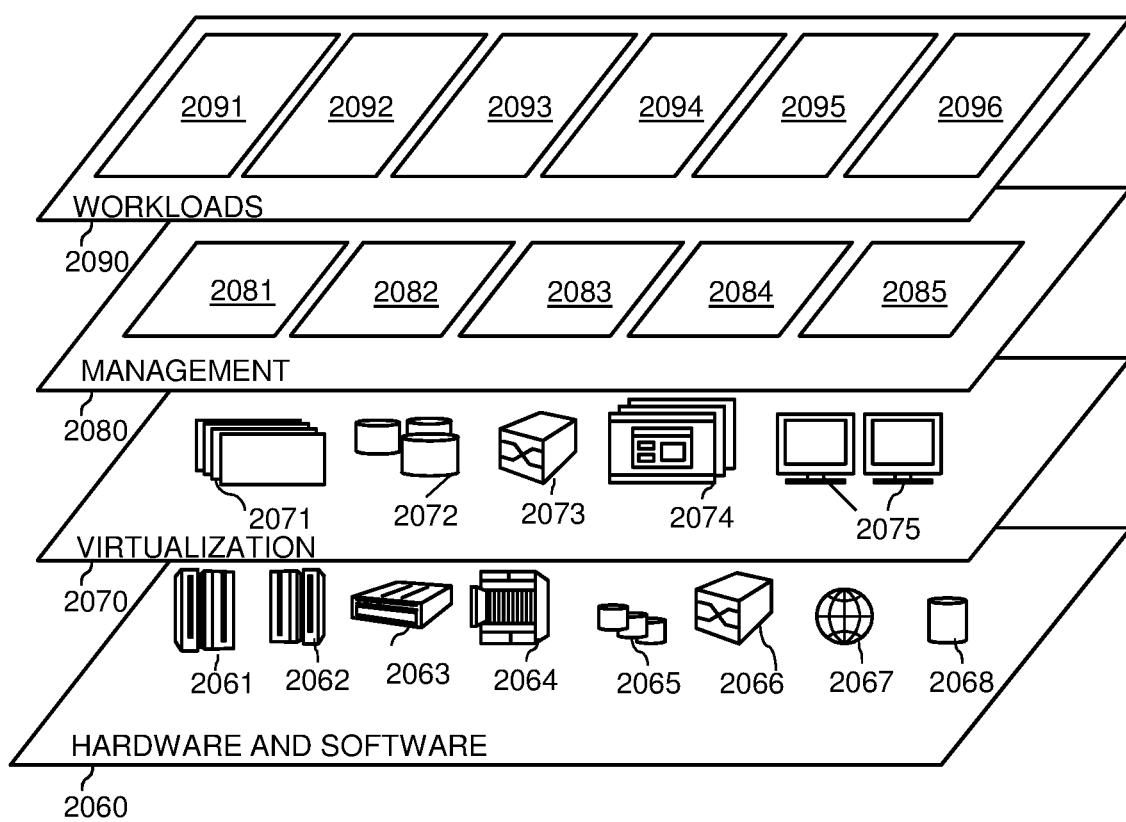
FIG. 8 is a block diagram depicting abstraction model layers according to an embodiment of the present invention.

Referring now to FIG. 8, a set of functional abstraction layers provided by cloud computing environment 2050 (FIG. 8) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and enhancing a fascial image of a user in real time by digital generation of a portion of a facial image using artificial intelligence during a video conference with a plurality of participants 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enhancing a facial image of a user in real time, by digital generation of a portion of a facial image using artificial intelligence (AI) during a video conference with a plurality of participants, comprising:
   receiving, at a control system, a digital image of a first portion of a user's face in real time, the digital image being captured from a camera viewing the first portion of the user's face, the first portion being part of a complete facial image which includes the first portion and one or more second portions, wherein the camera is unable to view the second portion of the user's face, the digital image thereby being incomplete and/or lacking in resolution for the second portion of the user's face;
   improving resolution and/or digitally completing the second portion of the user's facial image that the camera is not able to capture, using an AI system;
   the improving resolution including, receiving the digital image at the AI system which includes a Generative Adversarial Network (GAN), the GAN using first additional user facial images of the user to generate enhanced additional facial images using a training method by the GAN; and
   generating, in real time, a complete enhanced digital facial image of the user's face, using the GAN, which includes the digital image of the first portion of the user's face, the first additional user facial images, and the AI generated enhanced additional facial images.

2. The method of claim 1, further comprising:
   transmitting, using the control system, the real time complete enhanced digital facial image of the user's face in a video conference, whereby the real time complete enhanced digital facial image is shared with participants of the video conference in real time during the video conference.

3. The method of claim 1, further comprising:
   the first additional user facial images being accessible, with permission from the user, from social media sources of the user, and/or receiving the first additional user facial images from the user; and
   the training method including capturing second additional digital images of the user's face using another camera when the user is in view of the another camera to use the second additional digital images in the generating of the enhanced second additional facial images.

4. The method of claim 1, further comprising:
   performing facial mesh training cycles for the GAN, as part of the training method, the training cycles including a user speaking a specialized audiologist-created paragraph to create training data to generate, using an interpolation, the enhanced additional facial images.

5. The method of claim 1, wherein the digital image of the first portion of the user's face is received from a camera in a vicinity of the user and viewing the first portion of the user's face.

6. The method of claim 1, wherein the digital image of the first portion of the user's face is received from a head-set having a camera viewing the first portion of the user's face.

7. The method of claim 1, further comprising:
   receiving the digital image of the first portion of the user's face from a camera in a head set wherein the camera is viewing the first portion of the user's face and the user is moving or in motion such that a stationary camera would not view the user's face to provide a real-time facial image of the user to video conference participants; and
   transmitting, using the control system, the real time complete enhanced digital facial image of the user's face in a video conference, whereby the real time complete enhanced digital facial image is shared with participants of the video conference in real time during the video conference.

8. The method of claim 1, wherein the AI generated enhanced additional facial images and the first additional user facial images correspond to the second portions of the user's facial image, for the generation, in real time, of the complete enhanced digital facial image of the user's face.

9. A system for enhancing a facial image of a user in real time, by digital
   generation of a portion of a facial image using artificial intelligence (AI) during a video conference with a plurality of participants, which comprises:
   a computer system comprising: a computer processor, a computer-readable storage medium, and program instructions stored on the computer-readable storage medium being executable by the processor, to cause the computer system to:
   receive, at a control system, a digital image of a first portion of a user's face in real time, the digital image being captured from a camera viewing the first portion of the user's face, the first portion being part of a complete facial image which includes the first portion and one or more second portions, wherein the camera is unable to view the second portion of the user's face, the digital image thereby being incomplete and/or lacking in resolution for the second portion of the user's face;
   improve resolution and/or digitally completing the second portion of the user's facial image that the camera is not able to capture, using an AI system;
   the improving resolution including, receiving the digital image at the AI system which includes a Generative Adversarial Network (GAN), the GAN using first additional user facial images of the user to generate enhanced additional facial images using a training method by the GAN; and generate, in real time, a complete enhanced digital facial image of the user's face, using the GAN, which includes the digital image of the first portion of the user's face, the first additional user facial images, and the AI generated enhanced additional facial images.

10. The system of claim 9, further comprising:
transmitting, using the control system, the real time complete enhanced digital facial image of the user's face in a video conference, whereby the real time complete enhanced digital facial image is shared with participants of the video conference in real time during the video conference.

11. The system of claim 9, further comprising:
the first additional user facial images being accessible, with permission from the user, from social media sources of the user, and/or receiving the first additional user facial images from the user; and
the training method including capturing second additional digital images of the user's face using another camera when the user is in view of the another camera to use the second additional digital images in the generating of the enhanced second additional facial images.

12. The system of claim 9, further comprising:
performing facial mesh training cycles for the GAN, as part of the training method, the training cycles including a user speaking a specialized audiologist-created paragraph to create training data to generate, using an interpolation, the enhanced additional facial images.

13. The system of claim 9, wherein the digital image of the first portion of the user's face is received from a camera in a vicinity of the user and viewing the first portion of the user's face.

14. The system of claim 9, wherein the digital image of the first portion of the user's face is received from a head-set having a camera viewing the first portion of the user's face.

15. The system of claim 9, further comprising:
receiving the digital image of the first portion of the user's face from a camera in a head set wherein the camera is viewing the first portion of the user's face and the user is moving or in motion such that a stationary camera would not view the user's face to provide a real-time facial image of the user to video conference participants; and
transmitting, using the control system, the real time complete enhanced digital facial image of the user's face in a video conference, whereby the real time complete enhanced digital facial image is shared with participants of the video conference in real time during the video conference.

16. The system of claim 9, wherein the AI generated enhanced additional facial images and the first additional user facial images correspond to the second portions of the user's facial image, for the generation, in real time, of the complete enhanced digital facial image of the user's face.

17. A computer program product for enhancing a facial image of a user in real time, by digital generation of a portion of a facial image using artificial intelligence (AI) during a video conference with a plurality of participants, the computer program product comprising a computer readable storage medium having program instructions embodied therewith, wherein the computer readable storage medium is not a transitory signal per se, the program instructions executable by a computer to cause the computer to perform a method, comprising:

receiving, at a control system, a digital image of a first portion of a user's face in real time, the digital image being captured from a camera viewing the first portion of the user's face, the first portion being part of a complete facial image which includes the first portion and one or more second portions, wherein the camera is unable to view the second portion of the user's face, the digital image thereby being incomplete and/or lacking in resolution for the second portion of the user's face;

improving resolution and/or digitally completing the second portion of the user's facial image that the camera is not able to capture, using an AI system;

the improving resolution including, receiving the digital image at the AI system which includes a Generative Adversarial Network (GAN), the GAN using first additional user facial images of the user to generate enhanced additional facial images using a training method by the GAN; and generating, in real time, a complete enhanced digital facial image of the user's face, using the GAN, which includes the digital image of the first portion of the user's face, the first additional user facial images, and the AI generated enhanced additional facial images.

18. The computer program product of claim 17, further comprising:
transmitting, using the control system, the real time complete enhanced digital facial image of the user's face in a video conference, whereby the real time complete enhanced digital facial image is shared with participants of the video conference in real time during the video conference.

19. The computer program product of claim 17, further comprising:
the first additional user facial images being accessible, with permission from the user, from social media sources of the user, and/or receiving the first additional user facial images from the user; and
the training method including capturing second additional digital images of the user's face using another camera when the user is in view of the another camera to use the second additional digital images in the generating of the enhanced second additional facial images.

20. The computer program product of claim 17, further comprising:
performing facial mesh training cycles for the GAN, as part of the training method, the training cycles including a user speaking a specialized audiologist-created paragraph to create training data to generate, using an interpolation, the enhanced additional facial images.

* * * * *